(12) United States Patent
Syed et al.

(10) Patent No.: US 11,396,632 B2
(45) Date of Patent: Jul. 26, 2022

(54) ANTIFOULING COMPOSITIONS FOR PETROLEUM PROCESS STREAMS

(71) Applicant: ECOLAB USA INC., St. Paul, MN (US)

(72) Inventors: Abuzar Syed, Richmond, TX (US); Kailash Sawhney, Sugar Land, TX (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 17/245,457

(22) Filed: Apr. 30, 2021

(65) Prior Publication Data

US 2021/0246390 A1    Aug. 12, 2021

Related U.S. Application Data

(63) Continuation of application No. 15/833,231, filed on Dec. 6, 2017, now abandoned.

(60) Provisional application No. 62/431,088, filed on Dec. 7, 2016.

(51) Int. Cl.
| | | |
|---|---|---|
| *C10G 75/04* | (2006.01) | |
| *C10L 1/22* | (2006.01) | |
| *C09K 8/524* | (2006.01) | |
| *C10L 1/223* | (2006.01) | |
| *C10L 1/236* | (2006.01) | |
| *B05D 5/08* | (2006.01) | |
| *C10G 75/02* | (2006.01) | |
| *C10L 10/04* | (2006.01) | |
| *C10L 10/18* | (2006.01) | |

(52) U.S. Cl.
CPC ............ *C10G 75/04* (2013.01); *B05D 5/08* (2013.01); *C09K 8/524* (2013.01); *C10G 75/02* (2013.01); *C10L 1/22* (2013.01); *C10L 10/04* (2013.01); *C10L 10/18* (2013.01); *C10L 1/223* (2013.01); *C10L 1/2364* (2013.01)

(58) Field of Classification Search
CPC ......... C10G 75/02; C10G 75/04; C09K 8/524
See application file for complete search history.

(56) References Cited

U.S. PATENT DOCUMENTS

| | | |
|---|---|---|
| 3,413,104 A | 11/1968 | Mehmedbasich |
| 4,090,946 A | 5/1978 | Nottes et al. |
| 4,137,185 A | 1/1979 | Gardiner et al. |
| 4,731,095 A | 3/1988 | Garapon et al. |
| 4,929,778 A | 5/1990 | Roling |
| 5,055,212 A | 10/1991 | Le |
| 5,110,997 A | 5/1992 | Dickakian |
| 5,169,410 A * | 12/1992 | Wright .................... C10L 1/221 44/415 |
| 5,214,224 A | 5/1993 | Comer et al. |
| 5,266,186 A | 11/1993 | Kaplan |
| 5,824,829 A | 10/1998 | Maeda et al. |
| 5,955,404 A | 9/1999 | Horodysky et al. |
| 2003/0163951 A1 * | 9/2003 | Eydoux ................. C10L 1/2366 44/386 |
| 2003/0166811 A1 | 9/2003 | Peiffer et al. |
| 2004/0039125 A1 | 2/2004 | Breuer et al. |
| 2005/0113266 A1 * | 5/2005 | Krull ....................... C10L 1/146 508/243 |
| 2005/0261440 A1 | 11/2005 | Dickakian et al. |
| 2010/0175315 A1 | 7/2010 | McRobbie et al. |
| 2012/0264665 A1 | 10/2012 | Wu et al. |
| 2014/0275663 A1 | 9/2014 | Brons |
| 2016/0298039 A1 | 10/2016 | Falkler et al. |
| 2017/0190950 A1 | 7/2017 | Kundu et al. |

FOREIGN PATENT DOCUMENTS

| | | |
|---|---|---|
| CN | 101870750 A | 10/2010 |
| CN | 101979471 A | 2/2011 |
| EP | 0438849 A1 | 7/1991 |
| WO | 0206428 A1 | 1/2002 |
| WO | 2014165532 A1 | 10/2014 |
| WO | 2016164445 A1 | 10/2016 |

OTHER PUBLICATIONS

International Search Report for International Application No. PCT/US2017/064847, dated Feb. 6, 2018, 6 pages.
International Search Report for International Application No. PCT/US2017/064850, dated Mar. 19, 2018, 6 pages.
Written Opinion for International Application No. PCT/US2017/064847, dated Feb. 6, 2018, 6 pages.
Written Opinion for International Application No. PCT/US2017/064850, dated Mar. 19, 2018, 9 pages.
James G. Speight, "The Chemistry and Technology of Petroleum", 2nd Edition, New York: Marcel Dekker, Inc., pp. 96-97 and 404-451 (1991).
Coleman et al., Reaction of Primary Aliphatic Amines with Maleic Anhydride, J. Org. Chem., vol. 24, (1959) pp. 135-136.
David Warner, Unsaturated Bis-Arylimides Containing Four Phenylene Rings: Synthesis and Addition Polymerisation to Crosslinked Resins, University of Surrey, Guildford, 1988, 270 pages, Ph.D. dissertation accessed from: http://epubs.surrey.ac.uk/848544/1/10804113.pdf.

(Continued)

*Primary Examiner* — Aiqun Li
(74) *Attorney, Agent, or Firm* — Kagan Binder, PLLC

(57) ABSTRACT

Disclosed herein are antifouling compositions including a combination of one or more dispersant polymers and one or more inhibitors, the one or more dispersant polymers including the polymerized residues of one or more α-olefins and maleic anhydride, further wherein the maleic anhydride residues are reacted with a primary amine; and the one or more inhibitors including a functionalized p-phenylene diamine. Concentrates of the antifouling compositions in solvents are stable and pourable at temperatures of 0° C. to −40° C. The antifouling compositions are added to a petroleum product to form a treated petroleum product, wherein fouling by the treated petroleum product is reduced and a stable dispersion is formed over a wide range of processing conditions.

19 Claims, No Drawings

(56) References Cited

OTHER PUBLICATIONS

First Office Action in Chinese Application No. 201780074436.7, dated Mar. 3, 2021, 26 pages (including English Translation).
Brazilian Patent Office, "Office Action", issued in connection with corresponding patent application No. BR112019011161 dated Jul. 28, 2021, translation included, 6 pages.
Xianglin Kong, et al., Common Knowledge Evidence 1: "Organic Chemistry", pp. 219-226, China Electric Power Press, May 1997 (Official Copy Only—English Version Not Available).

* cited by examiner

ANTIFOULING COMPOSITIONS FOR PETROLEUM PROCESS STREAMS

TECHNICAL FIELD

The invention is directed to blends of polymeric dispersants with amino functional inhibitors for petroleum products, and uses thereof.

BACKGROUND

Hydrocarbon processing plants, from refineries to petrochemical plants suffer from fouling as a result of deposition of hydrocarbon byproducts deposited in heat exchangers, furnaces, water recycling loops, distillation columns, vessels, lines, overheads and other processing equipment. These byproducts include a variety of hydrocarbons that may be present in crude oil as well as the byproducts of hydrocarbon refining processes. Fouling of the interior surfaces of processing equipment occurs over a time period that may vary from months to years depending on the unit being considered.

Asphaltene, a foulant present in crude oil sources prior to human extraction or collection thereof, is believed to exist as a colloidal dispersion stabilized by other components of crude oil. These naturally occurring foulants can be destabilized by a variety of mechanical, thermal, and chemical conditions involved in oil production and processing. Other foulants arise by polymerization or other reactions of vinylic byproducts of petroleum processing such as styrene, butadiene, cyclopentadiene, and the like; oxidized hydrocarbons; and thermal decomposition products resulting from the degradation of larger molecules, such as one of the foulants listed above, either alone or combined with one or more other compounds present in a petroleum source. Such foulants may be termed "synthetic foulants," since they arise as a result of human actions taken to process crude oil sources; whereas asphaltenes may be termed "natural foulants" since these are present in crude oil sources as obtained from subterranean reservoirs.

Hydrotreating is a conventional petroleum process that provides an illustrative example of how synthetic foulants arise. Hydrotreating is a catalyzed hydrogenation process that leads to the conversion of nitrogen and sulfur containing contaminants to hydrogen sulfide and ammonia. It is also used to convert aromatics and olefins into saturates. Thermal and oxidative conditions during hydrotreating leads to the formation of synthetic foulants. The foulants formed, or synthesized, during such processes adhere to the processing equipment surface, such as preheat exchangers, resulting in reduction of the unit throughput and pressure drop across heat exchanger tubes.

Both natural and synthetic foulants are of concern to the operators of hydrocarbon processing plants, since regardless of origin the accumulation and precipitation of a foulant on any one or more surfaces within processing equipment or storage containers causes a plethora of operator problems. Such problems include flow restrictions and loss of sensitivity of measurement devices such as thermocouples placed in the processing stream. The need to clean foulants from the interior surfaces of petroleum processing equipment is a significant source of plant downtime. Consequently, there is an ongoing need for new methods and compositions to address fouling.

While natural foulants may be addressed by dispersants, some synthetic foulants may be prevented from forming altogether. For example, adding an oil-soluble free radical inhibitor, also referred to as an antioxidant, to the hydrotreatment process stream described above reduces observed fouling, likely due to slowing or stopping of certain synthetic pathways to form the synthetic foulants characteristically associated with the process stream.

Comer et al., U.S. Pat. No. 5,214,224 discloses olefin-maleic anhydride copolymers useful as a dispersant for foulants in liquid petroleum process streams. However, these anhydride functional polymers are reactive toward hydrolytic conditions, undergoing ring-opening addition of water to the anhydride functionalities. The hydrolyzed polymer does not have antifouling properties and due to low solubility can itself become a foulant. Thus, the anhydride-functional polymers are unsuitable for use in processing streams contaminated with water. Further, hydrolysis of anhydride functionalities may take place slowly over time even in a substantially dry petroleum product where water is an impurity of the petroleum product.

Additionally, the olefin-maleic anhydride copolymers—and their hydrolyzed byproducts—tend to either precipitate from the concentrates in which the polymers are sold, or form viscous, even solidified blends with solvents at low temperatures encountered in the field during winter petroleum processing operations, which may easily reach 0° C. to −40° C. This is because the olefin-maleic anhydride copolymers are insoluble or are only sparingly soluble in petroleum-based solvents. even at temperatures of about 20° C.; at lower temperatures, instabilities result, giving rise to difficulties in pumping, pouring, or otherwise transporting the polymer-solvent combinations in the field in e.g. wintertime.

This instability further affects petroleum process streams where a combination of dispersant and inhibitor are indicated. To use the olefin-maleic anhydride copolymers as the dispersant along with an oil-soluble inhibitor, two separate additions are typically required instead of adding a blend of these two materials to the petroleum process stream. This is because the olefin-maleic anhydride copolymers—and their hydrolyzed byproducts—are insoluble or are only sparingly soluble in the liquid petroleum products or the petroleum-based solvents employed to deliver the oil-soluble inhibitors into petroleum process streams. Since some petroleum processing equipment only includes e.g. a single port to introduce additives to the petroleum process stream, the olefin-maleic anhydride copolymers, while effective as dispersants in such systems, are not optimal for use due to solubility issues.

There is a need to prevent fouling in petroleum process streams due to both natural and synthetic foulants. There is a need for a combination that can achieve the foregoing by application to a petroleum process stream of single composition including both a dispersant and an inhibitor. There is a further need to provide concentrates of antifouling compositions that are stable dispersions and are pumpable or pourable to temperatures of about 0° C. to −40° C.

SUMMARY

Disclosed herein are antifouling compositions including or consisting essentially of a combination of one or more dispersant polymers and one or more inhibitors, the one or more dispersant polymers including, consisting essentially of, or consisting of the polymerized residues of one or more α-olefins and maleic anhydride, further wherein 80 mol %-100 mol % of the maleic anhydride residues are reacted with a primary amine defined by the formula R—$NH_2$, wherein R is a linear or branched hydrocarbon moiety comprising 6 to 30 carbon atoms or a mixture of two or more such moieties; the inhibitor including, consisting essentially of, or consisting of a functionalized p-phenylene diamine (fPDA) defined by the formula

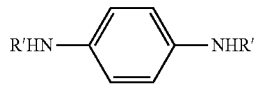

wherein R' are independently selected to be linear, branched, aromatic, or alicyclic moieties comprising 1 to 12 carbon atoms optionally including one or more O, S, N, or halogen atoms with the proviso that the fPDA includes no primary amine moieties. The ratio of the one or more dispersant polymers to the one or more inhibitors in the composition is about 10:1 to 1:10 by weight, in some embodiments about 1:3 to 3:1 by weight. In embodiments, the dispersant polymers are characterized by the substantial absence of anhydride moieties or imide moieties. In embodiments, the dispersant polymers are characterized by a substantial absence of anhydride and imide moieties. The antifouling compositions are soluble in liquid petroleum products or liquid petroleum process streams as well as nonpolar solvents conventionally employed to introduce compounds into petroleum process streams; nonpolar solvents are liquids having a dielectric constant of less than 15 as well as blends of such liquids.

In embodiments, the antifouling composition is a an antifouling concentrate comprising, consisting essentially of, or consisting of a combination of one or more dispersant polymers as described above, one or more inhibitors as described above, and a solvent, wherein the one or more dispersant polymers and the one or more inhibitors are present at a combined total of about 15 wt % to 90 wt % in the solvent and the concentrate is pumpable or pourable at a temperature between about 0° C. to −40° C. In embodiments, the solvent has a dielectric constant of 15 or less.

Also disclosed herein is treated petroleum product including, consisting essentially of, or consisting of a petroleum product and about 1 ppm to 1000 ppm of an antifouling composition, the antifouling composition including or consisting essentially of a combination of one or more dispersant polymers and one or more inhibitors, the one or more dispersant polymers including, consisting essentially of, or consisting of the polymerized residues of one or more α-olefins and maleic anhydride, further wherein 80 mol %-100 mol % of the maleic anhydride residues are reacted with a primary amine defined by the formula R—NH$_2$, wherein R is a linear or branched hydrocarbon moiety comprising 6 to 30 carbon atoms or a mixture of two or more such moieties; and the inhibitor including, consisting essentially of, or consisting of a functionalized p-phenylene diamine (fPDA) defined by the formula

wherein R' are independently selected to be linear, branched, aromatic, or alicyclic moieties comprising 1 to 12 carbon atoms optionally including one or more O, S, N, or halogen atoms with the proviso that the fPDA includes no primary amine moieties. The ratio of the one or more dispersant polymers to the one or more inhibitors in the treated liquid petroleum product is about 10:1 to 1:10 by weight, in some embodiments about 1:3 to 3:1 by weight. In embodiments, the treated petroleum product is a treated liquid petroleum product. The treated liquid petroleum products are stable dispersions between about 20° C. and 400° C., wherein the dispersant polymers are thermolytically stable and thereby reduce or prevent fouling due to both natural and/or synthetic foulants within the treated liquid petroleum products during one or more petroleum processing operations, such as hydrotreating. Further, the dispersant polymers are hydrolytically stable and thus are suitable to include in concentrates, petroleum products, and petroleum process streams contaminated with water, such as about 1 wt % water or less.

In some embodiments, the treated petroleum products are treated petroleum process streams. The treated petroleum process streams cause 50% to 100% less fouling of petroleum process equipment over a first period of time, when compared to fouling of a petroleum process stream (that is, the untreated petroleum process stream) over the same period of time. In some embodiments, the treated petroleum process streams and products are stable dispersions, further wherein dispersion stability is maintained during one or more petroleum processing operations, within one or more petroleum process streams, during disposal of the composition within one or more petroleum process apparatus, and during transportation and storage of a treated petroleum product.

Also disclosed herein is a method of reducing fouling in one or more petroleum process streams, the method including, consisting essentially of, or consisting of: a) combining one or more dispersant polymers and one or more inhibitors at a weight ratio of about 1:10 to 10:1 to form an antifouling composition, wherein the one or more dispersant polymers include, consist essentially of, or consist of the polymerized residues of one or more α-olefins and maleic anhydride, further wherein 80 mol %-100 mol % of the maleic anhydride residues are reacted with a primary amine defined by the formula R—NH$_2$, wherein R is a linear or branched hydrocarbon moiety comprising 6 to 30 carbon atoms or a mixture of two or more such moieties; and the inhibitor includes, consists essentially of, or consists of a functionalized p-phenylene diamine (fPDA) defined by the formula

wherein R' are independently selected to be linear, branched, aromatic, or alicyclic moieties comprising 1 to 12 carbon atoms optionally including one or more O, S, N, or halogen atoms with the proviso that the fPDA includes no primary amine moieties; and b) applying about 1 ppm to 1000 ppm by weight or about 1 ppm to 1000 ppm by volume of the antifouling composition to a petroleum process stream to form a treated petroleum process stream. In embodiments, the antifouling composition is added to the petroleum process stream prior to the disposition of the petroleum product in petroleum process equipment; in other embodiments, the antifouling composition is added directly to the petroleum process stream while the petroleum process stream is disposed within the petroleum process equipment. In embodiments, method further includes subjecting the treated petroleum process to temperatures of about 20° C. to 400° C., further wherein the treated petroleum process stream is a stable dispersion, and/or wherein the treated petroleum process stream exhibits antifouling properties during the process. In some such embodiments, the process is hydrotreating.

DETAILED DESCRIPTION

Although the present disclosure provides references to preferred embodiments, persons skilled in the art will recognize that changes may be made in form and detail without departing from the spirit and scope of the invention. Reference to various embodiments does not limit the scope of the claims attached hereto. Additionally, any examples set forth in this specification are not intended to be limiting and merely set forth some of the many possible embodiments for the appended claims.

Additional advantages and novel features of the invention will be set forth in part in the description that follows, and in part will become apparent to those skilled in the art upon examination of the following, or may be learned through routine experimentation upon practice of the invention.

Definitions

As used herein, the term "fouling" means phase separation by precipitation from a petroleum product, further wherein the precipitant contacts and adheres to one or more interior surfaces of a petroleum process equipment.

As used herein, the term "foulant" means any one or more species that is present in a petroleum product and is capable of precipitation therefrom. Foulants include one or more natural foulants, one or more synthetic foulants, or combinations thereof as determined by context. In embodiments, one or more foulants are present as dispersed within a liquid petroleum product; in some such embodiments, the dispersion is a colloidal dispersion.

As used herein, the term "natural foulant" means any one or more foulant species inherently present in crude oil. In embodiments, natural foulants include asphaltene, heavy oil, tars, and aliphatic and aromatic hydrocarbons having a density less than that of water, commonly referred to as light oil.

As used herein, the term "synthetic foulant" means any one or more foulant species that are byproducts of petroleum refining processes. In various embodiments, synthetic foulants may include any one or more of: polynuclear aromatic hydrocarbons, coke, oxidized hydrocarbons, polymers formed from polymerization of vinylic byproducts of petroleum processing such as styrene, butadiene, cyclopentadiene, and the like; and thermal decomposition products resulting from the degradation of larger molecules, such as one of the above listed materials, and combinations of these.

As used herein, the term "petroleum product" and like terms means any hydrocarbon product obtained from a subterranean reservoir, any product derived therefrom, or any mixture thereof. Nonlimiting examples of petroleum products include but are not limited to crude oil, reduced crude oil, crude distillate, heavy oil, or bitumen, hydrotreated oil, refined oil, byproducts of petroleum product processing such as pyrolysis, hydrotreating, or phase separation, or mixtures of two or more of these.

As used herein, the term "liquid petroleum product" and like terms means a petroleum product that is substantially a liquid at 20° C.

As used herein, the term "petroleum process stream" and like terms means any petroleum product disposed within petroleum process equipment in fluid contact with an interior surface thereof, wherein the process stream includes one or more foulants, that is, one or more natural foulants, one or more synthetic foulants, or a mixture of two or more thereof. The process stream may be substantially static, such as a petroleum product disposed within in a settler (separator) or storage container for a selected period of contact, such as up to two years. The process stream may be substantially dynamic, such as a liquid petroleum product disposed within a pipe during transportation of the product from a first location to a second location. In some embodiments the process stream includes one or more additional components related to petroleum processing; such components are not particularly limited.

As used herein, the term "petroleum process equipment", "petroleum process apparatus" and like terms means a manmade item having an interior surface including a metal, further wherein one or more petroleum products are fluidly contacted with the metal for any period of time and at any temperature further as determined by context. Petroleum process equipment includes items for removing petroleum products from a subterranean reservoir, for transporting one or more petroleum products from a first location to a second location, or for separating, refining, treating, isolating, distilling, reacting, metering, heating, cooling, or containing one or more petroleum products.

As used herein, the terms "pumping", "pumpable", "pouring", "pourable", or like terms refers, as determined by context, to "pour point" according to ASTM D-97A, or alternatively to a petroleum product having a sufficiently low viscosity to pump or pour using conventional oil collecting, refining, transporting, and storing equipment. The test indicated by ASTM D-97A includes the procedure of lowering the temperature of a composition by 3° C./minute, wherein the temperature at which no movement of the concentrate is observable is termed the pour point of the composition.

As used herein, the terms "dispersion", "emulsion", "dispersible", "dispersibility", "dispersed", "emulsified" and like terms refer to a material that is insoluble in a liquid medium but does not undergo gross phase separation from it. These terms may be used relatively, i.e. wherein dispersibility of a material is increased or decreased, as determined by context, to mean more of less of the indicated material is present as dispersed vs. separated; or wherein dispersion stability is increased or decreased, as determined by context. A dispersion or emulsion is unstable or stable in various embodiments as determined by context, further wherein "stable" and like terms means kinetically stable, thermodynamically stable, hydrolytically stable, shear stable, thermolytically stable, or a combination of two or more thereof, and "unstable" refers to an observation of one or more of phase separation and viscosification.

As used herein, the term "thermolytically stable" or like terms as applied to an antifouling polymer means that the polymer does not undergo substantial thermal degradation reactions when present in a petroleum process stream subjected to temperatures of about 20° C. to 400° C.

Unless specifically indicated otherwise, any carboxylate groups present within any polymer described herein are recited with reference to the free carboxylic acid (i.e. "acid groups" or the like), wherein the reference is further intended to encompass any conjugate base thereof (carboxylate), or a combination of both, e.g. as residues within a single compound or a single polymer chain.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe any range of values, for example "about 1 to 5" the recitation means "1 to 5" and "about 1 to about 5" and "1 to about 5" and "about 1 to 5" unless specifically limited by context.

As used herein, the terms "substantially" and "consisting essentially of" modifying, for example, the type or quantity of an ingredient in a composition, a property, a measurable quantity, a method, a position, a value, or a range, employed in describing the embodiments of the disclosure, refers to a variation that does not affect the overall recited composition, property, quantity, method, position, value, or range thereof in a manner that negates an intended composition, property, quantity, method, position, value, or range. Examples of intended properties include, solely by way of nonlimiting examples thereof, dispersibility, stability, rate, solubility, and the like; intended values include weight of a component added, concentration of components added, and the like. The effect on methods that are modified include the effects caused by variations in type or amount of materials used in a process, variability in machine settings, the effects of ambient conditions on a process, and the like wherein the manner or degree of the effect does not negate one or more intended properties or results; and like proximate considerations. Where modified by the term "substantially" or "consisting essentially of", the claims appended hereto include equivalents to these types and amounts of materials.

As used herein, any recited ranges of values contemplate all values within the range and are to be construed as support for claims reciting any sub-ranges having endpoints which are real number values within the recited range. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

Discussion

It has been discovered that fouling due to foulants in petroleum process streams can be reduced or eliminated using a combination of a dispersant polymer and an inhibitor, wherein the dispersant polymer is the reaction product of a maleic anhydride-functional precursor polymer with a primary amine and the inhibitor is a functionalized p-phenylene diamine having substantially no primary amino functionality.

The precursor polymer is copolymer of a C10-C36 α-olefin and maleic anhydride. In embodiments, the α-olefin has 10 to 36 carbons, or 14 to 32 carbons, or 18 to 30 carbons, or 24 to 28 carbons wherein the number of carbons is an average number, reflecting a blend of compounds, or a substantially single value, as determined by the user. The precursor polymer comprises a weight ratio of the α-olefin residues to maleic anhydride residues of about 1:1 to about 1:5. The weight average molecular weight ($M_w$) of the precursor polymer is from about 5000 g/mol to about 100,000 g/mol, when analyzed by gel permeation chromatography. The precursor polymer is synthesized using conventional techniques, e.g. radical addition polymerization principles and techniques familiar to those of skill in the art of polymer synthesis. The polymer is further analyzed using conventional methodology familiar to the polymer chemist, including gel permeation chromatography and infrared analysis, to ensure target structure and molecular weight are achieved in the precursor polymer. The precursor polymer is further described in Comer et al., U.S. Pat. No. 5,214,224, the contents of which are incorporated herein in their entirety and for all purposes.

The precursor polymer is then reacted with a linear or branched, C6-C30 primary amine or a mixture of such primary amines to form the corresponding dispersant polymer (or a dispersant polymer mixture, in embodiments where a mixture of amines is employed). The linear or branched primary amine has 6 to 30, or 14 to 28, or 16 to 24, or 16 to 20 carbons wherein the number of carbons is an average number, reflecting a blend of compounds, or a substantially single value, as determined by the user. The reacting is accomplished by contacting the precursor polymer with the one or more primary amines at temperatures between about 20° C. and 100° C. In embodiments, the contacting is carried out using a molar ratio of amine moieties to anhydride moieties of about 1:2 to 2:1, or about 1:1 to 1:2, or about 2:3 to 3:2, or about 1:1 to 2:3, or about 1:1. In embodiments, the contacting is carried out in a solvent; in some such embodiments, the solvent is a petroleum solvent, that is, a liquid petroleum product or liquid mixture thereof intended for use as a solvent. Such petroleum solvents include e.g. paraffinic solvents, mineral oil, "HAN" or heavy aromatic naphtha, mixtures thereof, and the like.

The dispersant polymers are soluble in nonpolar solvents, that is, solvents having a dielectric constant of about 15 or less.

In embodiments, the contacting does not result in the formation of imide moieties, and as a result in some embodiments the dispersant polymers are characterized by the substantial absence of imide moieties. Such contacting includes contacting at temperatures between about 20° C. and 100° C., for example about 30° C. to 90° C., or about 40° C. to 80° C., or about 50° C. to 70° C. The substantial absence of imide moieties is suitably determined, for example, by infrared analysis. In embodiments, the dispersant polymer includes 0 mol % to about 20 mol % of unreacted anhydride moieties, or 0 mol % to about 18 mol %, or 0 mol % to about 16 mol %, or 0 mol % to about 14 mol %, or 0 mol % to about 12 mol %, or 0 mol % to about 10 mol %, or 0 mol % to about 8 mol %, or 0 mol % to about 6 mol %, or 0 mol % to about 4 mol %, or 0 mol % to about 2 mol %, or 0 mol % to about 1 mol %, or 0 mol % to about 0.5 mol %, or 0 mol % to about 0.1 mol % of unreacted anhydride moieties when compared for example by infrared analysis to the precursor polymer.

The composition including the dispersant polymer further includes an inhibitor, which is an fPDA (functionalized p-phenylene diamine). The fPDA is characterized as having substantially no primary amino functionality. The fPDA includes, consists essentially of, or consists of a compound having the formula

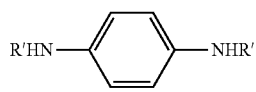

wherein R' are independently selected to be linear, branched, aromatic, or alicyclic moieties comprising 1 to 12 carbon atoms optionally including one or more O, S, N, or halogen atoms with the proviso that the fPDA includes no primary amine moieties. In some embodiments, both R' are selected to be the same or substantially identical, wherein in other embodiments R' are selected to be chemically different. In embodiments, the R' groups are independently phenyl, substituted phenyl, or branched alkyl. One representative and nonlimiting inhibitor structure is, for example,

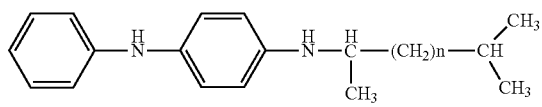

wherein n is an integer of 1 to 8. In embodiments, the inhibitor is an N-(1,3-dimethylalkyl)-N'-phenyl-1,4-phenylenediamine or an N-(1,4-dimethylalkyl)-N'-phenyl-1,4-phenylenediamine, such as N-(1,4-dimethylpentyl)-N'-phenyl-1,4-phenylenediamine, or N-(1,3-dimethylbutyl)-N'-phenyl-1,4-phenylenediamine, or a mixture of two or more thereof. The fPDA are characterized as soluble in nonpolar solvents, that is, solvents having a dielectric constant of about 15 or less.

The antifouling compositions are soluble in liquid petroleum products or liquid petroleum process streams as well as nonpolar solvents conventionally employed to introduce compounds into petroleum process streams. Nonpolar solvents are compounds that are liquids at 20° C. and have a dielectric constant of less than 15. "Nonpolar solvent" means a single nonpolar solvent compound or a blend of two or more such compounds. The dispersant polymers and the inhibitors are soluble in nonpolar solvents, that is, solvents having a dielectric constant of about 15 or less.

The ratio of the one or more dispersant polymers to the one or more inhibitors in the antifouling composition is about 10:1 to 1:10 by weight, in some embodiments about 1:5 to 5:1, or about 2:5 to 5:2, or about 2:3 to 3:2, or about 1:3 to 3:1, or about 10:1 to 1:1, or about 5:1 to 1:1, or about 4:1 to 1:1, or about 3:1 to 1:1, or about 2:1 to 1:1 by weight. While the dispersant polymers and the inhibitors are mutually soluble over a far broader range than what is recited herein, we have found that the stated ratios are more effective than others for reducing fouling in one or more petroleum process streams where synthetic foulants arise during the selected process and/or within the selected petroleum processing equipment.

We have found that these antifouling polymers are thermolytically stable under conditions commonly employed or encountered within petroleum process streams, thus may be suitably added to one or more petroleum processing streams prior to subjecting the processing stream to one or more thermolytically challenging processes, such as hydrotreating. We have found that these antifouling polymers as a class are thermolytically stable within petroleum process streams subjected to conventional conditions within petroleum process equipment. That is, the antifouling polymers retain their antifouling properties in one or more petroleum processing streams while the treated petroleum process stream is subjected to temperatures of about 20° C. to 400° C., or for example in petroleum process streams such as hydrotreating equipment, where temperatures of 400° C. can be reached.

In embodiments, the antifouling composition is a concentrate including the dispersant polymer, the inhibitor, and a solvent having a dielectric constant of less than 15 or a blend of two or more thereof. Such concentrates are not possible using the precursor polymer, due to the inherently low solubility of the precursor polymer in solvents having a dielectric constant of less than 15. Similarly, one cannot make a suitable concentrate (at least 15 wt % solids) of e.g. the precursor polymer and inhibitor in solvents having a dielectric constant of less than 15 due to incompatibility of the components. However, the present antifouling composition is easily blended in a solvent having a dielectric constant of less than 15 to form stable dispersions of at least 15% solids and as much as 90 wt % solids. In embodiments, the antifouling composition is are added to a solvent to form an antifouling concentrate, followed by addition of the antifouling concentrate to one or more petroleum process streams to form one or more treated petroleum process streams.

Thus, provided herein is an antifouling concentrate including, consisting essentially of, or consisting of one or more dispersant polymers, one or more inhibitors, and one or more solvents. In embodiments, the one or more solvents have a dielectric constant of about 15 or less. The solvent employed to form a concentrate may be a petroleum solvent, that is, a liquid petroleum product or liquid mixture thereof intended for use as a solvent. Such petroleum solvents include e.g. paraffinic solvents, mineral oil, "HAN" or heavy aromatic naphtha, mixtures thereof, and the like. Such solvents include those having a dielectric constant of about 15 or less.

In embodiments, the antifouling concentrate includes about 15 wt % to 90 wt % of a combination of one or more dispersant polymers and one or more inhibitors, as described above, or about 15 wt % to 85 wt %, or about 15 wt % to 80 wt %, or about 15 wt % to 75 wt %, or about 15 wt % to 70 wt %, or about 15 wt % to 65 wt %, or about 15 wt % to 60 wt %, or about 15 wt % to 55 wt %, or about 15 wt % to 50 wt %, or about 15 wt % to 45 wt %, or about 15 wt % to 40 wt %, or about 15 wt % to 35 wt %, or about 15 wt % to 30 wt %, or about 15 wt % to 25 wt %, or about 20 wt % to 80 wt %, or about 30 wt % to 50 wt %, or about 50 wt % to 90 wt %, or about 50 wt % to 80 wt %, or about 30 wt % to 70 wt %, or about 40 wt % to 70 wt % of an antifouling composition that is a combination of one or more dispersant polymers and one or more inhibitors, as described above.

The antifouling concentrates are stable at temperatures of about 60° C. to −40° C., wherein the concentrates are pumpable or pourable over the range and further do not form observable precipitate therein. The lower end of this range reflects the advantageous and stable nature of the antifouling concentrates. Thus, the antifouling concentrates are characterized as pumpable or pourable at temperatures of about 0° C. to as low as −40° C., as measured by ASTM D-97, or about 0° C. to −40° C., or about −10° C. to −40° C., or about −15° C. to −40° C., or about −20° C. to −40° C., or about −20° C. to −30° C. as determined by ASTM D-97, which includes the procedure of lowering the temperature of a composition by 3° C./minute and recording the temperature at which no movement of the concentrate is observable as the pour point of the composition.

In embodiments, the antifouling compositions are thermolytically stable and have antifouling properties in petroleum processing streams when subjected to temperatures of about 20° C. to 400° C., for example about 100° C. to 400° C., or about 100° C. to 350° C., or about 100° C. to 300° C., or about 100° C. to 250° C., or about 100° C. to 200° C., or about 100° C. to 150° C. In embodiments, the antifouling compositions form stable dispersions with foulants present in petroleum processing streams during petroleum processing operations wherein the treated petroleum process stream is subjected to temperatures of about 20° C. to 400° C., for example about 100° C. to 400° C., or about 100° C. to 350° C., or about 100° C. to 300° C., or about 100° C. to 250° C., or about 100° C. to 200° C., or about 100° C. to 150° C. In embodiments, the antifouling compositions reduce or prevent fouling in petroleum processing streams during petroleum processing operations wherein the treated petroleum process stream is subjected to temperatures of about 20° C. to 400° C., for example about 100° C. to 400° C., or about 100° C. to 350° C., or about 100° C. to 300° C., or about 100° C. to 250° C., or about 100° C. to 200° C., or about 100° C. to 150° C.

We have further found that the antifouling compositions are effective to reduce or prevent fouling due to both natural and synthetic foulants, when the composition is added to a petroleum process stream in an amount corresponding to about 1 ppm to 1000 ppm by weight of a total of the combination of dispersant polymer and inhibitor, or about 5 ppm to 900 ppm, or about 10 ppm to 900 ppm, or about 100 ppm to 900 ppm, or about 100 ppm to 800 ppm, or about 100 ppm to 700 ppm, or about 100 ppm to 600 ppm, or about 100 ppm to 500 ppm, or about 100 ppm to 400 ppm, or about 100 ppm to 300 ppm, or about 100 ppm to 200 ppm, or about 1 ppm to 500 ppm, or about 10 ppm to 500 ppm, or about 10 ppm to 400 ppm, or about 10 ppm to 300 ppm by weight of a total of the antifouling composition added to the liquid petroleum process stream to form a treated liquid petroleum process stream.

A treated petroleum product is a petroleum product including a total of about 1 ppm to 1000 ppm by weight of an antifouling composition. A treated liquid petroleum product is a liquid petroleum product including a total of about 1 ppm to 1000 ppm by weight of an antifouling composition. A treated petroleum process stream is a petroleum product disposed in petroleum processing equipment and including a total of about 1 ppm to 1000 ppm by weight of an antifouling composition. A treated liquid petroleum process stream is a liquid petroleum product disposed in petroleum processing equipment and including a total of about 1 ppm to 1000 ppm by weight of an antifouling composition. The antifouling composition includes, consists essentially of, or consists of a dispersant polymer and an inhibitor, wherein the ratio of the dispersant polymer to the inhibitor is about 1:10 to 10:1.

The treated petroleum products are at least one of kinetically stable, thermodynamically stable, hydrolytically stable, shear stable, thermolytically stable, or a combination of two or more thereof during and after obtaining, transporting, storing, or cooling thereof. The treated liquid petroleum products are at least one of kinetically stable, thermodynamically stable, hydrolytically stable, shear stable, thermolytically stable, or a combination of two or more thereof during and after undergoing one or more human actions that cause a synthetic foulant to form. Such human actions include, but are not limited to, refining, treating, distilling, reacting, or heating, of one or more petroleum products. In embodiments, the human action is hydrotreating. In order to prevent synthetic foulant formation, it is necessary to apply the antifouling composition to the liquid petroleum process stream prior to the process stream being subjected to the process wherein foulants are caused to arise. Thus for example, if the process to be employed is hydrotreating, the antifouling composition must be applied to the liquid petroleum process stream prior to the process stream undergoing the hydrotreatment process.

The inhibitor is employed in the antifouling composition (as well as the treated petroleum products and treated petroleum process streams referenced herein) to reduce the formation of synthetic foulants in petroleum process streams. P-phenylene diamine and related compounds are known to have free-radical inhibiting activity and antioxidant activity in some chemical systems. It is known to add such inhibitors to one or more liquid petroleum process streams to inhibit the formation of free radicals that lead to oxidation and polymerization and the resulting byproducts—which are synthetic foulants in liquid petroleum process streams. The inhibitor does not, when used alone, behave as a dispersant; that is, the inhibitor does not appear to have properties commensurate with dispersing foulants in any petroleum product.

The dispersant polymers, in sharp contrast, are not inhibitors and would not be expected to possess inhibition properties. That is, the dispersant polymers are not expected to reduce or prevent the formation of synthetic foulants in petroleum process streams. Rather, the dispersant polymers' role is assumed to be that of simply a dispersant for any natural or synthetic foulants that are present in the petroleum process stream.

Thus, the inhibitor and the dispersant individually have mutually exclusive expected effects in petroleum process streams: the inhibitor prevents formation of certain synthetic foulants in a petroleum process stream but does not disperse foulants; the dispersant polymer disperses foulants in a petroleum process stream but does not prevent formation of synthetic foulants. The inhibitor and the dispersant are expected to behave in an additive fashion when combined, that is, the properties attributable to the inhibitor and the dispersant polymer individually are expected to translate to substantially the same properties when combined as an antifoulant composition and applied to a liquid petroleum product or a liquid petroleum process stream.

However, we have observed that the antifouling composition has a greater inhibition effect than an equivalent amount of the inhibitor alone in a liquid petroleum product or a liquid petroleum process stream. This effect is completely unexpected to one of skill: there is nothing in any previously observed properties of either the inhibitor or the dispersant polymer, nor is there anything in the chemical structures of these two disparate components to suggest that adding the dispersant to the inhibitor increases the inhibition properties of the mixture over an equivalent amount of the inhibitor alone. Further, while the antifouling composition has greater than expected inhibition properties, the dispersant properties of the antifouling composition are about the same as the expected dispersant properties of the dispersant polymer alone. Thus, the increased inhibition properties of the antifouling composition are not commensurate with any loss of dispersant properties.

The improved inhibition properties of the antifouling composition compared to the inhibitor alone is determined by measuring the break point of the composition according to ASTM-D525. According to the test, a liquid petroleum sample is oxidized in a pressure vessel filled with oxygen at 690 kPa to 705 kPa and 15° C. to 25° C. and then heated to a temperature of 98° C. to 102° C. Pressure in the vessel is monitored over time. The break point is defined as the point in the pressure-time curve that is preceded by a pressure drop of exactly 14 kPa within 15 minutes, and is succeeded by a drop of not less than 14 kPa in 15 minutes. The induction period is defined as the time elapsed between the placing of the pressure vessel in the temperature bath and the break point. Using this test, the induction period and break point are indicative of the tendency of the liquid petroleum product to form synthetic foulants during periods of storage.

In embodiments, when measured according to ASTM-D525, the antifouling composition provided an induction period that is about 2× to 10× longer than the liquid petroleum product alone (where "2×"=100% increase), for example about 3× to 10×, or about 4× to 10×, or about 5× to 10× longer than the liquid petroleum product alone. Further, the antifouling compositions provided an induction period that is about 1.5× to 5.0× longer than the induction period attributable to addition of inhibitor alone, for example about 1.5× to 4.5×, or about 1.5× to 4.0×, or about 1.5× to 3.5×, or about 1.5× to 3.0×, or about 1.5× to 2.5×, or about 1.5× to 2.0×, or about 2.0× to 5.0×, or about 2.0× to 4.5×, or about 2.0× to 4.0×, or about 2.0× to 3.5×, or about 2.0× to 3.0×, or about 2.0× to 2.5× longer than the induction period attributable to addition of inhibitor alone to the liquid petroleum product or liquid petroleum process stream.

In some embodiments, the treated petroleum process streams undergo substantially less fouling of contacted petroleum processing equipment during one or more petroleum processing operations than the corresponding untreated petroleum process stream. Reduction or prevention of fouling is observed within one or more petroleum process streams, during disposal of the treated petroleum process stream within one or more petroleum process apparatus, or during storage of a petroleum product within a storage vessel.

Thus, disclosed herein is a method of reducing fouling in one or more petroleum process streams, the method including, consisting essentially of, or consisting of applying about 1 ppm to 1000 ppm by weight or by volume of an antifouling composition to a liquid petroleum process stream to form a treated liquid petroleum process stream. The antifouling composition comprises, consists essentially of, or consists of a combination of one or more dispersant polymers and one or more inhibitors, wherein the dispersant polymer is the amide reaction product of a maleic anhydride-functional precursor polymer with a primary amine, and the inhibitor is a functionalized p-phenylene diamine having substantially no primary amino functionality. Any of the compositions described above are useful in conjunction with the method of reducing fouling, wherein the method includes applying about 1 ppm to 1000 ppm by weight or by volume of an antifouling composition to a liquid petroleum process stream to form a treated liquid petroleum process stream.

The antifouling compositions are advantageously added to a petroleum product or a petroleum process stream to target a total about 1 ppm to 1000 ppm by weight of the combined dispersant polymer plus inhibitor, or about 5 ppm to 500 ppm based on the weight of the petroleum product or the petroleum process stream, as selected by the user. In embodiments, or about 10 ppm to 1000 ppm, or about 10 ppm to 500 ppm, or about 20 ppm to 500 ppm, or about 30 ppm to 500 ppm, or about 40 ppm to 500 ppm, or about 50 ppm to 500 ppm, or about 60 ppm to 500 ppm, or about 70 ppm to 500 ppm, or about 80 ppm to 500 ppm, or about 90 ppm to 500 ppm, or about 100 ppm to 500 ppm, or about 5 ppm to 450 ppm, or about 5 ppm to 400 ppm, or about 5 ppm to 350 ppm, or about 5 ppm to 300 ppm, or about 5 ppm to 250 ppm, or about 5 ppm to 200 ppm, or about 5 ppm to 150 ppm, or about 5 ppm to 100 ppm, or about 10 ppm to 300 ppm, or about 10 ppm to 250 ppm, or about 50 ppm to 250 ppm, or about 50 ppm to 200 ppm, or about 100 ppm to 200 ppm of the combined dispersant polymer plus inhibitor is added to the petroleum product or a petroleum process stream.

We have found that the antifouling compositions are thermolytically stable and are further observed to retain antifouling properties during one or more petroleum processing operations. That is, the antifouling compositions retain antifouling properties as recited herein, while a treated petroleum process stream is subjected to temperatures of about 20° C. to 400° C. during one or more petroleum processing operations. Such petroleum processing includes hydrotreating. Accordingly, the method further includes in some embodiments subjecting a treated petroleum process stream to a temperature of about 20° C. to 400° C.; such subjected does not result in an observation of fouling of the surfaces of the petroleum process equipment contacted by the treated petroleum process stream.

The antifouling composition is applied to a liquid petroleum process stream batch-wise, continuously, or semi-continuously. In some embodiments, the applying is manual; in other embodiments, the applying is automated. In embodiments, the amount of the antifouling composition applied over a selected unit of time is varied with a variable composition of the associated petroleum process stream. Such variability in dosing may be conducted manually by periodic testing of the liquid petroleum process equipment interior surfaces, following by adjusting the amount of the antifouling composition up or down for more or less observed foulant, respectively; or automatically by monitoring of one or more conditions within the interior of the petroleum process equipment and signaling the need to apply more antifoulant composition to the liquid petroleum process stream.

In embodiments, the petroleum product present in the one or more petroleum process streams is crude oil, reduced crude oil, heavy oil, bitumen, coker charge, hydrotreater influent, hydrotreater effluent, flashed crude, light cycle oil, or a diesel or naphtha refinery stream. In embodiments, the petroleum process equipment is any equipment conventionally associated with the collecting, processing, transportation, or storage of one or more of crude oil, reduced crude oil, crude distillate, heavy oil, bitumen, coker charge, flashed crude, light cycle oil, or a diesel or naphtha refinery stream, including pipes and associated infrastructure used to fluidly connect process equipment items together to facilitate processing of a process stream disposed therein.

In embodiments, the antifouling composition is applied to a petroleum process stream by dissolving or dispersing the dispersant polymer and the inhibitor in a solvent to form the antifouling composition, followed by addition of the antifouling composition to the petroleum process stream to form a treated petroleum process stream. The solvent may be a petroleum solvent, that is, a liquid petroleum product or liquid mixture thereof intended for use as a solvent. Such petroleum solvents include e.g. paraffinic solvents, mineral oil, "HAN" or heavy aromatic naphtha, mixtures thereof, and the like.

The treated petroleum process streams, which in embodiments are treated liquid petroleum products disposed in fluid contact with an interior surface of petroleum processing equipment, result in reduction or elimination of fouling of the contacted interior surface. In embodiments, fouling is measured as a relative increase in retention of solids within the treated petroleum product compared to the retention of solids in untreated petroleum product over the same time period. In embodiments, fouling is measured as a relative decrease in the weight or volume of precipitate arising from a selected period of contact of a treated petroleum process stream in an associated petroleum process equipment item, relative to the same period of contact of the petroleum process equipment with the corresponding untreated petroleum process stream. Stated differently, a reduction in fouling is a relative decrease in the measured weight or volume of solids deposited on or precipitated from petroleum process equipment contacted with the treated petroleum process stream over a selected period of time, when compared to the weight or volume of solids deposited or precipitated from an untreated petroleum process stream over the same period of time.

The treated process streams result in reduction or elimination of fouling of the contacted interior surface when compared to the corresponding (untreated) process stream. In embodiments, the treated process streams undergo 50% to 100% reduction in fouling compared to the corresponding process stream (that is, the untreated process stream), or about 60% to 100%, or about 70% to 100%, or about 80% to 100%, or about 90% to 100%, or about 95% to 100%, or about 97% to 100%, or about 98% to 100% reduction in measurable fouling of the interior surfaces of petroleum process equipment compared to the corresponding process stream. In embodiments, the percent reduction in fouling is determined as defined in ASTM-D525. The test is understood by those of skill to be predictive of relative extent of fouling expected in one or more petroleum process streams.

EXPERIMENTAL

The following examples are intended to show experimental embodiments of the invention. The embodiments are not limiting to the scope of the claims appended hereto. It will be recognized that various modifications and changes may be made without following the experimental embodiments described herein, further without departing from the scope of the claims.

Example 1

A polyalkenyl succinate, which is a copolymer of C24-C28 α-olefin with maleic anhydride (CAS No. 68459-79-0) was obtained according to the procedures outlined in Comer et al., U.S. Pat. No. 5,214,224. Then 50 g of the polymer (obtained as a solid, 100% active polymer content) was dispersed in 100 g of HAN (heavy aromatic naphtha), and the dispersion was heated to 60-65° C. with constant stirring. Then 20 g oleyl amine (20 g) was slowly charged to the mixture over a period of 30 minutes. The temperature of the reaction mixture was observed to rise to about 80° C. The mixture was stirred for additional 2 hours while maintaining the temperature at 60-65° C. The reaction was monitored by infrared for the disappearance of the anhydride peaks (1780 and 1711 cm$^{-1}$) and appearance of the amide peak (1679 cm$^{-1}$).

When the reaction was determined to be complete, an additional 100 g HAN was added to the mixture, and the mixture was stirred for an additional 30 minutes. Then the mixture was allowed to cool to ambient temperature and filtered to remove trace amounts of insoluble material in the reaction vessel. The product was observed to be 26 wt % solids in HAN and is referred to below as the "dispersant polymer product" or the product of Example 1.

Examples 2-7

Break point and induction period of a liquid petroleum product in the presence of the polymer of Example 1 was determined using ASTM-D525. The treated or untreated liquid petroleum sample was oxidized in a pressure vessel filled with oxygen at 690 kPa to 705 kPa at 15° C. to 25° C. and then heated to a temperature of 98° C. to 102° C. Pressure in the vessel was monitored over time. The break point is defined in ASTM-D525 as the point in the pressure-time curve that is preceded by a pressure drop of exactly 14 kPa within 15 minutes, and is succeeded by a drop of not less than 14 kPa in 15 minutes. The induction period is defined in ASTM-D525 as the time elapsed between the placing of the pressure vessel in the temperature bath and the break point. Using this test, the induction period and break point results are measured to provide an indication of the tendency of the liquid petroleum product to form synthetic foulants during periods of storage. A shorter induction period is indicative of a less stable dispersion.

Using ASTM-D525, the induction period of a heavy coker naphtha stream was determined to be 1.3 hours in the absence of additives as a control. The test was then repeated using the materials added to the heavy coker naphtha stream as indicated in Table 1. The corresponding induction periods for the control and various petroleum products having compounds added thereto are also listed in Table 1 as Examples C and 2-4 and 6. Referring to Table 1, Dispersant A is a polyalkenyl succinate, 20-25% in HAN; Dispersant B is a copolymer of C24-C28 α-olefin with maleic anhydride (CAS No. 68459-79-0), 15-20% in HAN; and Inhibitor C is a blend of N-(1,3-dimethylbutyl)-N'-phenyl-1,4-phenylenediamine and N-(1,4-dimethylpentyl)-N'-phenyl-1,4-phenylenediamine.

To the dispersant polymer product of Example 1 (26 wt % solids in HAN) was added a blend of N-(1,3-dimethylbutyl)-N'-phenyl-1,4-phenylenediamine and N-(1,4-dimethylpentyl)-N'-phenyl-1,4-phenylenediamine, in an amount corresponding to a weight ratio of 70:30 dispersant polymer: inhibitor blend in HAN, to form an antifouling composition. The antifouling composition was added to the heavy coker naphtha stream in varying amounts corresponding to the desired ppm equivalent of inhibitor. Thus, Example 5 of Table 1 shows the induction period of a heavy coker naphtha stream combined with 250 ppm of the antifouling composition, which corresponds to 75 ppm of the inhibitor added via the addition of the antifouling composition. Example 7 of Table 1 shows the induction period of a heavy coker naphtha stream combined with 833 ppm of the antifouling composition, which corresponds to 250 ppm of the inhibitor. Comparison of performance is made by comparing Examples 4 and 5 in Table 1. Similarly, comparison of performance is also made by comparing Examples 6 and 7 in Table 1.

TABLE 1

Induction periods under ASTM-D525 for a heavy coker naphtha stream with and without the indicated additives.

| Example | Additive, by weight | Induction period, hr |
|---|---|---|
| C | None | 1.3 |
| 2 | Dispersant A, 250 ppm | 1.2 |
| 3 | Dispersant B, 250 ppm | 1.2 |

TABLE 1-continued

Induction periods under ASTM-D525 for a heavy coker naphtha stream with and without the indicated additives.

| Example | Additive, by weight | Induction period, hr |
|---|---|---|
| 4 | Inhibitor C, 75 ppm | 1.6 |
| 5 | Antifouling composition, 250 ppm (75 ppm equivalents of inhibitor) | 1.9 |
| 6 | Inhibitor C, 250 ppm | 3.0 |
| 7 | Antifouling composition, 833 ppm (250 ppm equivalents of inhibitor) | 4.3 |

The induction period of the heavy coker naphtha stream including the antifouling composition is longer than the induction period of the corresponding induction period observed for the equivalent weight of inhibitor alone. Stated differently, the functionalized p-phenylene diamine inhibitors provide greater inhibitive performance in the presence of the antifouling polymers than they do when used alone—even though the antifouling polymers themselves exhibit no inhibitive properties. This result is completely unexpected by one of skill, as the effect of a dispersant is different from that of an inhibitor and the two effects are expected to be complementary or additive at best. The dispersant is not expected to affect inhibition and the inhibitor is not expected to affect dispersion. Yet this example shows that the presence of the dispersant improves the inhibition of a petroleum product, as measured by the induction period under ASTM-D525.

Example 8

Using the procedure and additive compositions of Examples 2-7, a coker naphtha feed was tested for induction period under ASTM-D525. No additive resulted in an induction period of 1.96 hours; 500 ppm Inhibitor C provided an induction period of 6.35 hours; and 1666 ppm of the Antifoulant Composition (corresponding to 500 ppm Inhibitor C) provided an induction period of greater than 8.0 hours: that is, the test was stopped at 8.0 hours without reaching the end of the induction period.

Example 9

Using the procedure and additive compositions of Examples 2-7, a naphtha feed preprocessed to remove sulfur-containing compounds was tested for induction period under ASTM-D525. No additive resulted in an induction period of 1 hour; 250 ppm Inhibitor C provided an induction period of 2.5 hours; and 833 ppm of the Antifoulant Composition (corresponding to 250 ppm Inhibitor C) provided an induction period of 3.1 hours.

Examples 8 and 9 show that the technology described herein is applicable to a range of petroleum process streams and feeds having different process histories and different compositional content.

Example 10

The pour point of a dispersant polymer in a concentrate was determined using ASTM D-97, HAN as solvent. The pour point of a 15 wt % dispersion in HAN of the polyalkenyl succinamide having CAS No. 68459-79-0 was found to be −12° C. The pour point of a 15 wt % dispersion in HAN of the polymer synthesized in Example 1 was found to be −26° C. At −26° C., the dispersion of the polymer of Example 1 was further observed to be free of precipitate.

It can be understood from the foregoing that the polymer of Example 1 provides a concentrate having a pour point that is sufficiently low to provide pumpability and pourability of the product in the field, even under commonly encountered winter conditions. Additionally, the pumpable/pourable product including the polymer of Example 1 remains substantially a single phase when subjected to temperatures as low as −26° C.; that is, the dispersion is stable at this temperature. These stability of the concentrate is not changed when the inhibitor is added to the concentrate.

The invention illustratively disclosed herein can be suitably practiced in the absence of any element which is not specifically disclosed herein. Additionally each and every embodiment of the invention, as described herein, is intended to be used either alone or in combination with any other embodiment described herein as well as modifications, equivalents, and alternatives thereof. In various embodiments, the invention suitably comprises, consists essentially of, or consists of the elements described herein and claimed according to the claims. It will be recognized that various modifications and changes may be made without following the example embodiments and applications illustrated and described herein, and without departing from the scope of the claims.

What is claimed is:

1. A method comprising, in order:
dispersing a precursor polymer in a solvent to form a dispersion, wherein the precursor polymer comprises the polymerized residues of a C10-C36 α-olefin and of maleic anhydride;
combining a primary amine with the dispersion whereby the temperature of the dispersion does not exceed about 80° C., wherein the primary amine is defined by the formula R—NH$_2$ wherein R is a linear or branched hydrocarbon moiety comprising 6 to 30 carbon atoms;
warming the dispersion at a temperature of about 40° C. to 80° C., thereby forming a dispersant polymer in the solvent, wherein the dispersant polymer is characterized by the substantial absence of both anhydride and imide moieties as determined by infrared analysis and wherein 80 mol % to 100 mol % of the maleic anhydride residues are reacted with the primary amine;
combining the dispersant polymer in the solvent with one or more inhibitors to form an antifouling composition, wherein the one or more inhibitors comprises a functionalized p-phenylene diamine defined by the formula

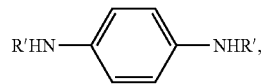

wherein R' are independently selected to be linear, branched, aromatic, or alicyclic moieties comprising 1 to 12 carbon atoms optionally including one or more O, S, N, or halogen atoms with the proviso that the functionalized p-phenylene diamine includes no primary amine moieties;
combining the antifouling composition with a petroleum product to form a treated petroleum product comprising about 1 ppm to 1000 ppm by weight of the antifouling composition; and
applying the treated petroleum product to hydrotreating equipment to form a treated petroleum process stream.

2. The method of claim 1, wherein the solvent is a petroleum solvent.

3. The method of claim 1, wherein the solvent is heavy aromatic naphtha.

4. The method of claim 1, wherein the dispersion is heated to 60-65° C. before combining the primary amine with the dispersion.

5. The method of claim 1, wherein the warming is at a temperature of 60-65° C.

6. The method of claim 1, the method further comprising monitoring the dispersion by infrared.

7. The method of claim 1, wherein the molar ratio of the primary amine to the polymerized residues of the maleic anhydride is about 1:2 to 2:1.

8. The method of claim 1, wherein the molar ratio of the primary amine to the polymerized residues of the maleic anhydride is about 1:1.

9. The method of claim 1, wherein the C10-C36 α-olefin is a C24-C28 α-olefin.

10. The method of claim 1, wherein the C10-C36 α-olefin is 1-octacocene.

11. The method of claim 1, wherein the molar ratio of the polymerized residues of the C10-C36 α-olefin to the polymerized residues of the maleic anhydride in the precursor polymer is about 1:1 to 1:5.

12. The method of claim 1, wherein the weight average molecular weight of the precursor polymer is from about 5,000 g/mol to about 100,000 g/mol as analyzed by gel permeation chromatography.

13. The method of claim 1, wherein the primary amine is oleyl amine.

14. The method of claim 1, wherein the antifouling composition is a concentrate, the concentrate comprising 15 wt % to 90 wt % of the combination of the dispersant polymer and the one or more inhibitors.

15. The method of claim 1, wherein one or more R' is phenyl, substituted phenyl, or branched alkyl.

16. The method of claim 1, wherein the one or more inhibitors comprises wherein n is an integer of 1 to 8.

17. The method of claim 1, wherein a ratio of the dispersant polymer to the one or more inhibitors in the antifouling composition is about 10:1 to 1:10 by weight.

18. The method of claim 1, wherein the treated petroleum process stream reaches a temperature of 400° C.

19. The method of claim 1, the method further comprising subjecting the treated petroleum process stream to temperatures of about 100° C. to 400° C.

* * * * *